April 18, 1961     G. H. AKLIN     2,979,988
FIVE COMPONENT PHOTOGRAPHIC OBJECTIVE
OF THE MODIFIED GAUSS TYPE
Filed Dec. 10, 1957
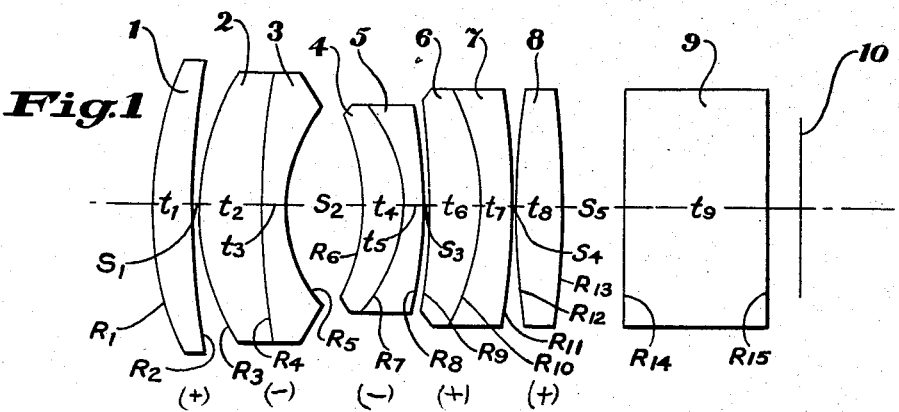
Fig.1
| F = 100 mm | | | | F:1.57 |
|---|---|---|---|---|
| Lens | N | V | Radii | Thicknesses |
| 1 | 1.7767 | 44.7 | $R_1$ = +75.54 mm. | $t_1$ = 9.33 mm. |
|  |  |  | $R_2$ = +260.3 | $S_1$ = 1.83 |
| 2 | 1.7445 | 45.8 | $R_3$ = +53.49 | $t_2$ = 14.39 |
| 3 | 1.6725 | 32.3 | $R_4$ = +347.9 | $t_3$ = 4.96 |
|  |  |  | $R_5$ = +30.89 | $S_2$ = 15.89 |
| 4 | 1.5880 | 61.2 | $R_6$ = -50.01 | $t_4$ = 9.93 |
| 5 | 1.6170 | 36.6 | $R_7$ = -31.77 | $t_5$ = 3.96 |
|  |  |  | $R_8$ = -91.96 | $S_3$ = 1.42 |
| 6 | 1.8804 | 41.1 | $R_9$ = -426.1 | $t_6$ = 10.92 |
| 7 | 1.7200 | 29.3 | $R_{10}$ = -52.46 | $t_7$ = 7.49 |
|  |  |  | $R_{11}$ = -440.1 | $S_4$ = 1.58 |
| 8 | 1.7530 | 50.6 | $R_{12}$ = +126.3 | $t_8$ = 10.32 |
|  |  |  | $R_{13}$ = -139.7 | $S_5$ = 15.00 |
| 9 | 1.5170 | 64.5 | $R_{14}$ = ∞ | $t_9$ = 56.84 |
|  |  |  | $R_{15}$ = ∞ |  |
Fig.2
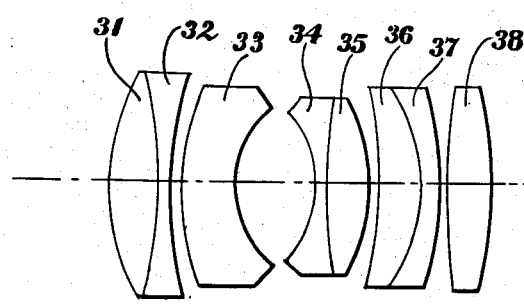
Fig.3
George H. Aklin
INVENTOR.
BY R. Frank Smith
J. M. Emerson Holmes
ATTORNEYS

United States Patent Office 2,979,988
Patented Apr. 18, 1961

2,979,988

FIVE COMPONENT PHOTOGRAPHIC OBJECTIVE OF THE MODIFIED GAUSS TYPE

George H. Aklin, Rochester, N.Y., assignor to Eastman Kodak Company, Rochester, N.Y., a corporation of New Jersey Filed Dec. 10, 1957, Ser. No. 701,881

7 Claims. (Cl. 88—57)

This invention relates to high aperture photographic objectives of the modified Gauss type or M-type, that is, to a modification of the type of objective which comprises two negative meniscus components concave toward each other and aligned between two positive components.

The object of the invention is to provide a high aperture objective in the range of about $f/2.0$ to about $f/1.5$ which is very highly corrected for spherical aberration, axial and lateral color, distortion, curvature of field, astigmatism, zonal spherical aberration, and oblique spherical aberration and coma so as to give a very highly resolved image over a moderate field of view of about $\pm 10°$ to $15°$.

The object of a special form of the invention is to provide an objective for use in combination with a prism between the objective and the focal plane on the short conjugate side.

The standard or norm of the Gauss or M-type objective consists of four components of which the outer two are positive and the inner two are negative meniscus components concave toward the central air space in which the aperture stop is mounted, at least one component on each side of the central airspace being compound for achromatizing the image. This standard type has been modified in various ways such as by splitting one or both of the positive components into two positive components each, by making more than two of the components compound, by introducing a small airspace into one or more of the components, or in other ways. It is generally known in the art that increasing the number of elements or components tends to improve a lens system, but it is not practical and economical to do this indiscriminately because of the added expense and also because of the increase in the stray light due to reflection from additional glass-air surfaces, the latter reason however being not so potent since the development of anti-reflection coatings. Generally the aim is to get as much in improved optical performance as possible for the increased expense of manufacture.

According to the present invention, a photographic objective is made up comprising five components in optical axial alignment and separated by air spaces, of which the front and rear components are positive and convex to the outside, the second and third components from the front are negative, meniscus and concave toward the diaphragm space therebetween, and the fourth component is numerically the weakest and consists of a front positive element and a rear negative element cemented together, the refractive index of the positive element being greater than that of the negative element by between 0.1 and 0.4 and the radius of curvature of the cemented surface being between $-0.25 F$ and $-F$, where F is the focal length of the objective as a whole, and where the minus sign indicates that the surface is concave toward the front. It will be noted that the first, second, third, and fifth components correspond in general to the first, second, third and fourth components of the normal or standard M-type lens, and that the modification lies in providing an additional doublet of weak power constituting the fourth component of the objective according to the invention. At least one component in front of the diapragm space and at least two behind the diaphragm space are compound for achromatizing the image.

Preferably the shape of said fourth component is such that the curvature of its front surface is between $-1/f$ and $+0.3/f$.

I have found that a known but unusual feature of the prior art cooperates favorably with the fourth component as above defined, in balancing out zonal errors. According to this preferred feature the third component is compound and consists of a front positive meniscus element and a rear negative meniscus element, the refractive index of the negative element being higher than that of the positive element by between 0.01 and 0.05.

The compound components are usually cemented, but the use of a small airspace or "internal contact surface" as defined in Patent No. 2,433,438 to Cox in one or two components is considered to be within the scope of the invention. In case a small airspace is included in a component, I prefer the curvatures of the two facing surfaces to differ by less than $0.25/f$.

The powers and shapes of the first, second, third and fifth components are generally similar to those of the first, second, third and fourth components respectively of known M-type objectives. The respective powers of the five components of objectives according to the invention are preferably within the ranges defined in the following table:

$$0.5P < +P_1 < 1.1P$$
$$0.5P < -P_2 < 1.1P$$
$$0.3P < -P_3 < 0.9P$$
$$-0.1P < P_4 < +0.6P$$
$$0.7P < P_5 < 1.4P$$

where $P_1$ to $P_5$ are the powers of the individual components and P is the power of the objective as a whole.

The shapes of the individual components may conveniently be defined by the radius of curvature of the front surface of each component, and as so defined are preferably within the ranges set forth as follows:

$$0.4\ F < +R_1 < 1.5\ F$$
$$0.3\ F < +R_3 < 0.7\ F$$
$$0.3\ F < -R_6 < 0.7\ F$$
$$-1.0 < F/R_9 < +0.3$$
$$-0.3 < F/R_{12} < +1.4$$

where $R_1$, $R_3$, $R_6$, $R_9$, and $R_{12}$ are the radii of curvature of the respective front surfaces of the individual components. The radius of curvature of the rear surface of each component is necessarily such as to give the component the required power.

The curvatures of the internal contact surfaces within the components are determined by the requirements of achromatism in a well-known manner. The general scheme is to consider the components in front of the diaphragm space as one member of the objective and the components behind the diaphragm space as a second member. In setting up a rough design, provisional values of the dispersive indices and the curvatures of the internal contact surfaces are determined by the well-known "(D–d)" method or in some equivalent manner to give at least approximate correction of axial color. The lateral color is next computed, and it is changed as necessary by changing the degree of color correction of the front member and restoring the axial color by a change in the opposite sense in the rear member. Computing one such change gives the coefficient of change of lateral color as a function of the (D–d) value of the front member, and the amount of change to give complete correction is then computed directly. This function may not be strictly linear but it is nearly enough linear to give a rapidly converging solution whereby both axial and lateral color are brought within acceptable limits. In some instances a change in an airspace may be used as a supplementary measure. Each member being positive in power, a member is changed in the direction of over-correction of color either by choosing a glass with a higher V-number in a positive element or a glass with a lower V-number in a negative element or by changing the radius of curvature of an internal contact surface between two elements in the direction which algebraicly increases the power of the element having the higher V-number and decreases the power of the other element. The opposite changes, of course, change the member in the direction of greater undercorrection for color. Many designers prefer to make the changes which improve axial and lateral color concurrently with bendings that are made for bringing the monochromatic abberations closer to acceptable values rather than making these changes separately as implied above. This, however, does not alter the principles of the method described above by which the radii of curvature of the internal contact surfaces are determined.

When a prism is used between an objective and its short conjugate focal plane, the objective itself should be undercorrected for spherical aberration and color substantially as described in Patent No. 918,147 Hastings, and may also be given a small residual of pincushion distortion to compensate for the effect of the prism. The resulting design problem is not greatly different from the designing of objectives for ordinary use, the chief difference being that the effect of the prism to be used is first computed, and then in designing the objective the designer does not aim at the usual substantially zero residuals of the various aberrations but aims at residuals which will compensate for the effect of the prism. The prism has very little effect on the higher order aberrations such as zonal spherical aberration and zonal astigmatism, and it has slightly more overcorrecting effect on the oblique spherical aberration for a given aperture than at the axis. In practice it is usually sufficient for adapting an objective for use with a prism to bend the several components to a degree determined customarily by a series of solutions assuming linear coefficients of change of each aberration with the bending of each component. This is a very common method of design of lens systems, once the preliminary setup has been made.

The added component according to the invention has a very beneficial effect on the zonal spherical aberration and on the oblique spherical aberration because the marginal rays, which are ordinarily overcorrected, strike the collective cemented surface at a high angle of incidence and are disproportionately refracted. This, of course, tends to undercorrect the spherical aberration over the whole aperture but this effect is easily counterbalanced by bending the various components during the trial solutions so that the whole spherical aberration curve (as graphed in the traditional way) is brought back to the desired position (usually substantially vertical if there is to be no prism behind the objective).

The preferred feature of structure of the third component provides an internal contact surface which the rays also strike at a high angle of incidence and at which the refractive index differs by a smaller amount and in the opposite sense from that at the surface in the fourth component, and accordingly this surface in the third component is particularly useful in conjunction with the added component according to the invention for adding a final touch to the zonal spherical aberration and the oblique spherical aberration correction.

In the accompanying drawing:

Figure 1 is a diagrammatic axial section of an objective according to the invention for use with a prism between the objective and the focal plane.

Figure 2 is a table of constructional data for a specific example according to Figure 1.

Figure 3 shows an objective according to the invention for use without a prism.

Figure 1 shows an objective according to the invention made up of five components. The first component is a single element or singlet 1 of positive power with its more strongly curved surface to the front. The second component is a negative meniscus cemented doublet consisting of a positive element 2 and a negative element 3. These first two components differ only in detail from the prior art. The third component is a negative meniscus doublet concave to the front, consisting of a positive meniscus element 4 and a negative meniscus element 5 cemented thereto. The diaphragm space in which the diaphragm or aperture stop is customarily mounted is between the second and third components, and both these components are concave thereto, as is characteristic of this type of lens. The fourth component, in which the principal feature of the invention is embodied, consists of a positive element 6 having a relatively high refractive index and a negative element 7 having a refractive index between 0.1 and 0.4 lower than that of the positive element cemented to the back thereof, the cemented surface being concave toward the front and having positive power and a radius of curvature $R_{10}$ between $-F/4$ and $-F$. The fifth component, like the first, is a positive singlet 8 in this example and is bi-convex in shape, as is usual in objectives of this type designed for use with a very distant object. In some M-type objectives for use at low or unit magnification the rear component is plano-convex or even meniscus in shape, and the invention may advantageously be embodied in such objectives as well. Between the rear element 8 and the focal plane 10 is a prism 9 which is required in the particular application for which this example was designed. Prisms are used behind photographic objectives for a number of purposes, for example as beam splitters in color photography or to reverse the image when copying printed mater. It is well known in optical theory that the effect of the prism upon the aberrations is the same as that of a plane parallel plate having the same refractive index and optical thickness. Accordingly, in Fig. 1, the prism is represented as a plane-parallel plate for simplicity.

Figure 2 is a table giving constructional data for a specific example of the embodiment of the invention shown in Figure 1.

This table is repeated here for convenience:

F=100 mm.    F:1.57

| Lens | N | V | Radii, mm. | Thicknesses, mm. |
|---|---|---|---|---|
| 1 | 1.7767 | 44.7 | $R_1 = +75.54$ | $t_1 = 9.33$ |
|   |        |      | $R_2 = +260.3$ | $s_1 = 1.83$ |
| 2 | 1.7445 | 45.8 | $R_3 = +53.49$ | $t_2 = 14.39$ |
| 3 | 1.6725 | 32.3 | $R_4 = +347.9$ | $t_3 = 4.96$ |
|   |        |      | $R_5 = +30.89$ | $s_2 = 15.89$ |
| 4 | 1.5880 | 61.2 | $R_6 = -50.01$ | $t_4 = 9.93$ |
| 5 | 1.6170 | 36.6 | $R_7 = -31.77$ | $t_5 = 3.96$ |
|   |        |      | $R_8 = -91.96$ | $s_3 = 1.42$ |
| 6 | 1.8804 | 41.1 | $R_9 = -426.1$ | $t_6 = 10.92$ |
| 7 | 1.7200 | 29.3 | $R_{10} = -52.46$ | $t_7 = 7.49$ |
|   |        |      | $R_{11} = -440.1$ | $s_4 = 1.58$ |
| 8 | 1.7530 | 50.6 | $R_{12} = +126.3$ | $t_8 = 10.32$ |
|   |        |      | $R_{13} = -139.7$ | $s_5 = 15.00$ |
| 9 | 1.5170 | 64.5 | $R_{14} = \infty$ | $t_9 = 56.84$ |
|   |        |      | $R_{15} = \infty$ |   |

In this table the optical elements (lens elements and prism) are numbered in the first column in order from front to rear; the second and third columns give the refractive index N for the sodium D line of the spectrum and the conventional dispersive index V for each element, and the third and fourth columns give the radii of curvature R of the optical surfaces, the thicknesses $t$ of the lens elements and the spaces $s$ between the components, each numbered by subscript in order from front to rear. The space $s_5$ between the rear lens element 8 and the prism 9 is only nominal, because as is well known the prism might be moved closer to the lens or farther from it and its effect on the optical image would not be changed, thus, the prism may be mounted at the most convenient position for any particular environment in which this system is used.

In this example the index differences $(N_6-N_7)$ and $(N_5-N_4)$ are 0.160 and 0.029 in accordance with features of the invention described above.

The power of the respective components are as follows:

$$P_1 = +0.73P$$
$$P_2 = -0.81P$$
$$P_3 = -0.60P$$
$$P_4 = +0.26P$$
$$P_5 = +1.14P$$

These powers are computed by the thin lens formula, disregarding the effect of the thicknesses of the lens elements. I find that the effect of the thicknesses of the lens components does not vary excessively in different objectives of the type to which the invention pertains and that this is a convenient way of defining the invention. It will be noted that these powers lie within the preferred ranges defined above, as do the radii $R_1$, $R_3$, $R_6$, $R_9$, $R_{10}$, and $R_{12}$, and that the fourth component is numerically the weakest of the five.

As is well known, it is advantageous in correcting the astigmatism and the zonal curvature of field to use high refractive index glasses, particularly in the positive elements. In this example the refractive indices of all the elements are between 1.55 and 1.95 and the average index of the positive elements is greater than 1.65, a feature which cooperates with the invention to give better correction.

An objective made up exactly as specified in Figure 2 could be used in a camera in which there is no prism by providing a plane parallel plate between the lens and the focal plane which would correspond in its effect on the image to the prism shown in Figures 1 and 2. However, as this adds unnecessary weight and expense, I contemplate modifying the design for use without a prism. To indicate roughly the probable direction and degree of bendings of the components in such a redesign, I have made an approximate solution using the same coefficients of change as were computed and used in determining the radii given in Figure 2. This solution is set forth in the following table:

| R# | Change (FΔ1/R) | On Axis | | 7½° | | | |
|---|---|---|---|---|---|---|---|
| | | Aberr. | Coma | ΔF' | ΔY_pr | ΔY_L | ΔY_u |
| Original | | −1.17 | +.98 | −.22 | −.08 | +.21 | +.02 |
| $R_6$ | −.100 | | | | | | |
| $R_8$ | −.075 | +0.43 | −.30 | −.02 | | −.05 | +.03 |
| $R_{12}$ | +.24 | +1.15 | −.22 | −.41 | −.02 | −.13 | +.10 |
| $R_1$ | +.12 | | | | | | |
| $R_2$ | +.13 | −.57 | −.31 | +.15 | −.02 | −.10 | −.25 |
| $R_3$ | +.06 | | | | | | |
| $R_5$ | +.06 | +.12 | −.30 | +.10 | | −.10 | −.07 |
| $R_{10}$ | +.15 | | | | | | |
| $R_{11}$ | −.03 | +.42 | | +.10 | | | +.12 |
| $s_1$ | +.83 mm. | −.28 | +.03 | +.10 | | +.02 | −.07 |
| "Final" | | +.10 | −.12 | −.20 | −.12 | −.15 | −.12 |

In this table the first column designates which radius or radii $R$ or space $s$ is changed, the second column indicates how much each is changed (the space $s$ measured in mm. and the radii in the dimensionless ratio $(F\Delta 1/R)$ where $\Delta 1/R$ is $(1/\text{new } R - 1/\text{old } R)$.

In every case $R_{13}$ is changed as necessary to maintain the E.F. unchanged at 100 mm. The remaining columns of the table give the corresponding changes in the various aberrations indicated at the tops of the columns. These aberrations will be defined in the next paragraph below. These changes added onto the "Original" values at the top of the table give the estimated "Final" values at the bottom. The color aberrations remain to be corrected by substituting a lower dispersion glass such as EK–330 (1.7551/47.2) or the same glass as in element 8 (EK–230) in element 1 or 2 or by varying the cemented surface $R_4$ or both.

The aberrations in the table are defined as follows. "Aberr." is spherical aberration and is the intersection length of a marginal ray minus the back focal length. "Coma" is $\Delta F - Aberr.$ where $\Delta F$ is $(Y_1/\sin U') - F$. $Y_1$ is the semidiameter of the entrance pupil, and $U'$ is the inclination of an emerging ray which entered at the margin of the entrance pupil and parallel to the axis. $\Delta F'$ is the primary curvature of field computed along a ray entering the lens at the stated angle of 7½° and approximately through the center of the exit pupil. $\Delta Y_{pr}$ is the distortion computed for the same ray. Finally $\Delta Y_L$ and $\Delta Y_u$ are the distortion values for rays at or near the lower and upper margins of the pupil, assuming that the oblique pencil approaches the front of the objective from below the axis. These last two values are useful in determining the oblique spherical aberration and coma.

By means of the above coefficients, the primary monochromatic aberrations are corrected by the standard method of repeated approximations, and by standard methods outlined above the axial and lateral color are corrected whereby the example given is modified for use as contemplated in the more usual environment without a prism. The above first step in this modification indicates that the radii would be roughly as follows: $R_1=68$ mm., $R_2=195$, $R_3=52$, $R_5=30$, $R_6=-48$, $R_9=-85$, $R_{10}=-57$, $R_{11}=-44$, $R_{12}=+99$ with further changes in the several radii, and particularly in $R_1$, to accommodate the change in refractive index in the first element, and $R_{13}$ is solved for to give a focal length of 100 mm.

Figure 3, shows an objective in which the invention is applied to a different known form of the Gauss type or M-type objective. In this known form the first and third components are compound, consisting of elements 31, 32 and 34, 35 respectively, and the second and last components are single elements 33 and 38. The invention is embodied in the objective by the addition of the weak doublet consisting of elements 36 and 37, corresponding to elements 6 and 7 as described above and being constructed within the ranges of power, shape and refractive index according to the invention as set forth above and in the claims below.

The third component is compounded in the more ordinary way with the negative element 34 in front of the positive element 35, to illustrate this form of the invention. However, it may also be constructed in the less usual reverse order shown by elements 4, 5 in Fig. 1.

The invention is similarly applied to other known forms of the M-type objective within the scope of the appended claims.

Objectives according to the invention have the same number of lens elements and the same number of glass air surfaces as some prior known lenses and give improved results in that the zonal spherical aberration is almost perfectly corrected and the correction of spherical aberration remains good over the designated field of view so that the resultant image is formed very sharply and gives very high resolution of detail, approaching the theoretical limit, over this field of view.

I claim:

1. An optical objective for photographic purposes comprising five lens components in optical alignment, their dioptric powers $P_1$ to $P_5$, numbered from front to rear, being within the ranges defined as follows:

$$0.5P < +P_1 < 1.1P$$
$$0.5P < -P_2 < 1.1P$$
$$0.3P < -P_3 < 0.9P$$
$$-0.1P < P_4 < +0.6P$$
$$0.7P < +P_5 < 1.4P$$

where P is the dioptric power of the objective as a whole, in which the first and fifth components are convex to the outside, the first component has its more strongly curved surface to the outside, the second and third components are meniscus in shape and concave toward the diaphragm space therebetween, the fourth component is numerically the weakest component of the five and consists of a front positive element and a rear negative element cemented together, the refractive index of the positive element being greater than that of the negative element by bewteen 0.1 and 0.4 and the radius of curvature of the cemented surface being between $-0.25\ F$ and $-F$, where F is the focal length of the objective as a whole and where the minus sign indicates that the surface is concave to the front, and in which at least one component in front of the diaphragm space and at least one component behind the diaphragm space in addition to said fourth component are compound for achromatizing the image.

2. An objective according to claim 1 in which the shape of said fourth component is such that the curvature of its front surface is between $-1/F$ and $+0.3/F$.

3. An objective according to claim 2 in which the third component from the front consists of a front positive meniscus element and a rear negative meniscus element, the refractive index of the positive element being less than that of the negative element by between 0.01 and 0.05.

4. An objective according to claim 1 in which the third component from the front consists of a front positive meniscus element and a rear negative meniscus element, the refractive index of the positive element being less than that of the negative element by between 0.01 and 0.05.

5. An objective according to claim 1 in which the shapes of the said components as defined by the radii of curvature $R_1$, $R_3$, $R_6$, $R_9$, and $R_{12}$ of the respective front surfaces of said components are so chosen that the following algebraic inequalities hold:

$$0.4\ F < +R_1 < 1.5\ F$$
$$0.3\ F < +R_3 < 0.7\ F$$
$$0.3\ F < -R_6 < 0.7\ F$$
$$-1.0 < F/R_9 < +0.3$$
$$-0.3 < F/R_{12} < +1.4$$

6. An objective made substantially according to the following specifications:

| Lens | N | Radii | Thicknesses |
|---|---|---|---|
| 1 | 1.78 | $R_1 = +0.8\ F$ | $t_1 = 0.09\ F$ |
|   |      | $R_2 = +3\ F$   | $s_1 = 0.02\ F$ |
| 2 | 1.74 | $R_3 = +0.5\ F$ | $t_2 = 0.14\ F$ |
|   |      | $R_4 = +3\ F$   |                 |
| 3 | 1.67 |                 | $t_3 = 0.5\ F$  |
|   |      | $R_5 = +0.3\ F$ | $s_2 = 0.16\ F$ |
|   |      | $R_6 = -0.5\ F$ |                 |
| 4 | 1.59 |                 | $t_4 = 0.10\ F$ |
|   |      | $R_7 = -0.3\ F$ |                 |
| 5 | 1.62 |                 | $t_5 = 0.04\ F$ |
|   |      | $R_8 = -0.9\ F$ | $s_3 = 0.01\ F$ |
|   |      | $R_9 = -4\ F$   |                 |
| 6 | 1.88 |                 | $t_6 = 0.11\ F$ |
|   |      | $R_{10} = -0.5\ F$ |              |
| 7 | 1.72 |                 | $t_7 = 0.07\ F$ |
|   |      | $R_{11} = -0.4\ F$ | $s_4 = 0.02\ F$ |
|   |      | $R_{12} = +1.3\ F$ |              |
| 8 | 1.52 |                 | $t_8 = 0.10\ F$ |
|   |      | $R_{13} = -1.4\ F$ |              | where the lens elements are numbered in order from front to rear in the first column, where the corresponding refractive index for the "D" spectral line is given in the second column, where the radii of curvature R of the optical surfaces, the thicknesses $t$ of the lens elements and the axial separations $s$ between the lens components, each numbered by subscripts from front to rear, are given in the last two columns, and where F is the equivalent focal length of the objective.

7. In combination, an objective according to claim 5 and a prism optically aligned therebehind between the objective and the image plane, said prism having an optical axial thickness between $0.4f$ and $0.7f$.

References Cited in the file of this patent

UNITED STATES PATENTS

| 2,343,627 | Aklin | Mar. 7, 1944 |
| 2,398,680 | Warmisham | Apr. 16, 1946 |
| 2,718,173 | Hacman et al. | Sept. 20, 1955 |
| 2,878,723 | Herzberger | Mar. 24, 1959 |

FOREIGN PATENTS

| 481,561 | Germany | Aug. 24, 1929 |
| 792,770 | France | Oct. 28, 1935 |
| 884,478 | France | Apr. 27, 1943 |
| 1,150,543 | France | Aug. 12, 1957 |